(12) United States Patent
Sun et al.

(10) Patent No.: US 8,201,009 B2
(45) Date of Patent: Jun. 12, 2012

(54) COMPUTER MANAGEMENT AND POWER BACKUP SYSTEM AND DEVICE

(75) Inventors: Chen Tung Sun, Taoyuan Hsien (TW); Tinway Chen, Taoyuan Hsien (TW); Andy Hsu, Taoyuan Hsien (TW); Lafin Lu, Taoyuan Hsien (TW)

(73) Assignee: T-Win Systems, Inc., Taoyuan Hsien (TW)

( * ) Notice: Subject to any disclaimer, the term of this patent is extended or adjusted under 35 U.S.C. 154(b) by 390 days.

(21) Appl. No.: 12/503,047

(22) Filed: Jul. 14, 2009

(65) Prior Publication Data

US 2011/0016340 A1    Jan. 20, 2011

(51) Int. Cl.
*G06F 1/00*    (2006.01)
(52) U.S. Cl. ........................ 713/340; 713/320
(58) Field of Classification Search .................. 713/320, 713/340
See application file for complete search history.

(56) References Cited

U.S. PATENT DOCUMENTS

| | | | | | |
|---|---|---|---|---|---|
| 5,784,382 | A | * | 7/1998 | Byers et al. | 714/726 |
| 5,822,600 | A | * | 10/1998 | Hallowell et al. | 713/340 |
| 5,915,118 | A | * | 6/1999 | Migita | 713/300 |
| 5,920,728 | A | * | 7/1999 | Hallowell et al. | 713/340 |
| 6,049,884 | A | * | 4/2000 | Tsuji | 713/323 |
| 7,028,220 | B2 | * | 4/2006 | Park | 714/22 |

FOREIGN PATENT DOCUMENTS

GB     2238675 A   *   6/1991

* cited by examiner

*Primary Examiner* — Chun Cao
(74) *Attorney, Agent, or Firm* — Guice Patents PLLC

(57) ABSTRACT

A computer power backup system and device are provided. When power to a computer system is lost, a battery backup unit provides power to the computer system for a while, allowing a power management control to send out an alert to an enterprise client so as to urge immediate action. If the power outage persists without being solved, and the power management control detects insufficient power in a battery of the battery backup unit, the power management control will store data in a storage device automatically and safely and then shut down the computer system. When power is restored, the power management control turns on the computer system automatically and begins charging the battery of the battery backup unit. Through the above operation, the integrity and safety of data in the computer system are secured.

5 Claims, 2 Drawing Sheets

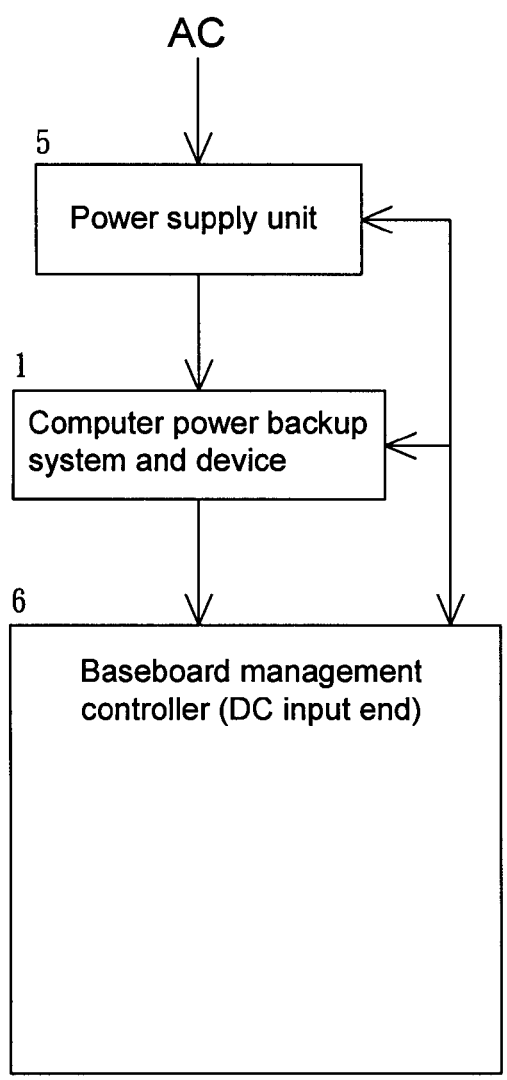
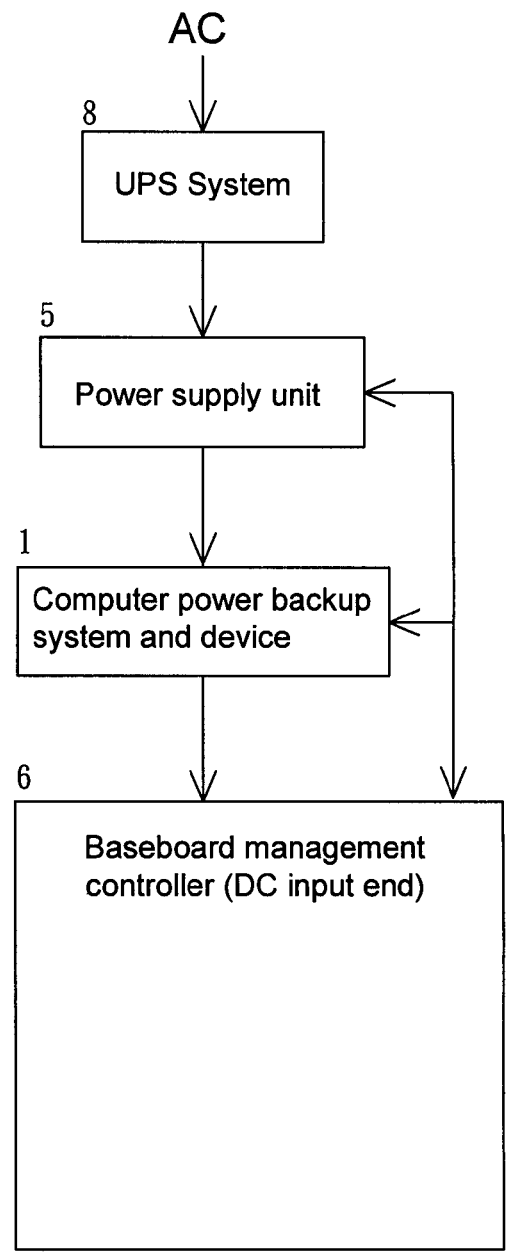
Fig. 2
Fig. 3

COMPUTER MANAGEMENT AND POWER BACKUP SYSTEM AND DEVICE

BACKGROUND OF THE INVENTION

1. Technical Field

The present invention relates to a computer power backup system and device including a battery backup unit, a DC-DC converter, and a power management control such that, when a computer system encounters power outage, the battery backup unit provides power to the computer system to maintain operation thereof for a short time, and meanwhile the power management control sends out an alert or stores data in a storage device automatically and safely, thereby ensuring the integrity and safety of data in the computer system.

2. Description of Related Art

With the rapid development of technology, computer servers not only have to meet such market demands as high efficiency and high stability, but are also required to preserve a large amount of data completely and safely. The latter requirement, in particular, calls for industrywide efforts to make constant improvement in design.

Generally, computer servers are used by enterprises to deal with massive amounts of data, including confidential files, transaction records, and so on of the enterprises, and to enable online data transfer whenever needed. If these computer servers, which play a vital role in the enterprises, fail to fully preserve the data due to fluctuation in the power system, the enterprises and their employees will be seriously affected. In some cases, loss of data may eventually lead to loss of competitive edge in the industry or even bankruptcy.

In order to prevent such irrevocable data loss, computer servers must, in addition to functioning as a large-scale data processing center, be equipped with a backup mechanism for maintaining basic operability of the system upon power failure, such that file transfer will not be interrupted. Hence, the installation of "uninterruptible power supply (UPS)" systems has been an important trend in the industry.

An UPS system is generally provided through external connection so as to prevent computer system outage, data loss, or damage of storage devices should the power system fail. However, if it is the power supply unit of the computer that is damaged, the computer will still face the aforesaid problems.

Owing to their mechanism, commercially available UPS systems are bulky, expensive, and therefore not widely adopted by enterprises in general, particularly the small- and medium-sized enterprises.

BRIEF SUMMARY OF THE INVENTION

The present invention provides a computer power backup system and device composed of three major parts, namely a battery backup unit (BBU), a DC-DC converter, and a power management control of a computer system.

The battery backup unit serves mainly to provide power from a battery when the computer system encounters power outage, thereby preventing the computer system from being shut down immediately. When power to the computer system resumes, the battery backup unit automatically charges a battery therein, thus allowing the computer power backup system to maintain effective in data protection.

The DC-DC converter serves mainly to convert power provided by a power supply unit (PSU) or the battery backup unit into power suitable for use by a system motherboard.

The computer power backup system and device according to the present invention operate on the following principle. When power to the computer system is lost, the battery backup unit provides power to the computer system for some time, thus allowing the power management control to send out an alert to an enterprise client and thereby urge the enterprise client to take immediate action. If the power outage persists without being solved, the power management control will, upon detecting insufficient power in the battery, store data in a storage device automatically and safely and then shut down the computer system. When power is restored, the power management control turns on the compute system automatically and begins to charge the battery of the battery backup unit. With the above operation, the integrity and safety of the data are secured.

As a substitute or backup for the conventional UPS systems, the computer power backup system and device of the present invention are modularized for convenient use in different server systems. The computer power backup system and device modules of the present invention can be connected in series with a server system by control wires and power cables without affecting the original functions of the server system. Consequently, when the server system loses power, operation of the server system is maintained for a while, allowing the server system to store data safely in a storage device through management control programs. In addition to providing complete data protection, the present invention uses a modular design conducive to economy of space. Hence, the computer power backup system and device of the present invention can be enclosed entirely within the server system, thus keeping the machine room neat and tidy.

BRIEF DESCRIPTION OF THE SEVERAL VIEWS OF THE DRAWINGS

The invention as well as a preferred mode of use, further objectives, and advantages thereof will be best understood by referring to the following detailed description of an illustrative embodiment in conjunction with the accompanying drawings, wherein:

FIG. 2 is a schematic drawing showing the computer power backup system and device according to the present invention being connected by itself to a computer system; and FIG. 3 is a schematic drawing showing the computer power backup system and device according to the present invention being used in series connection with a conventional UPS system.

DETAILED DESCRIPTION OF THE INVENTION

Figure 1:
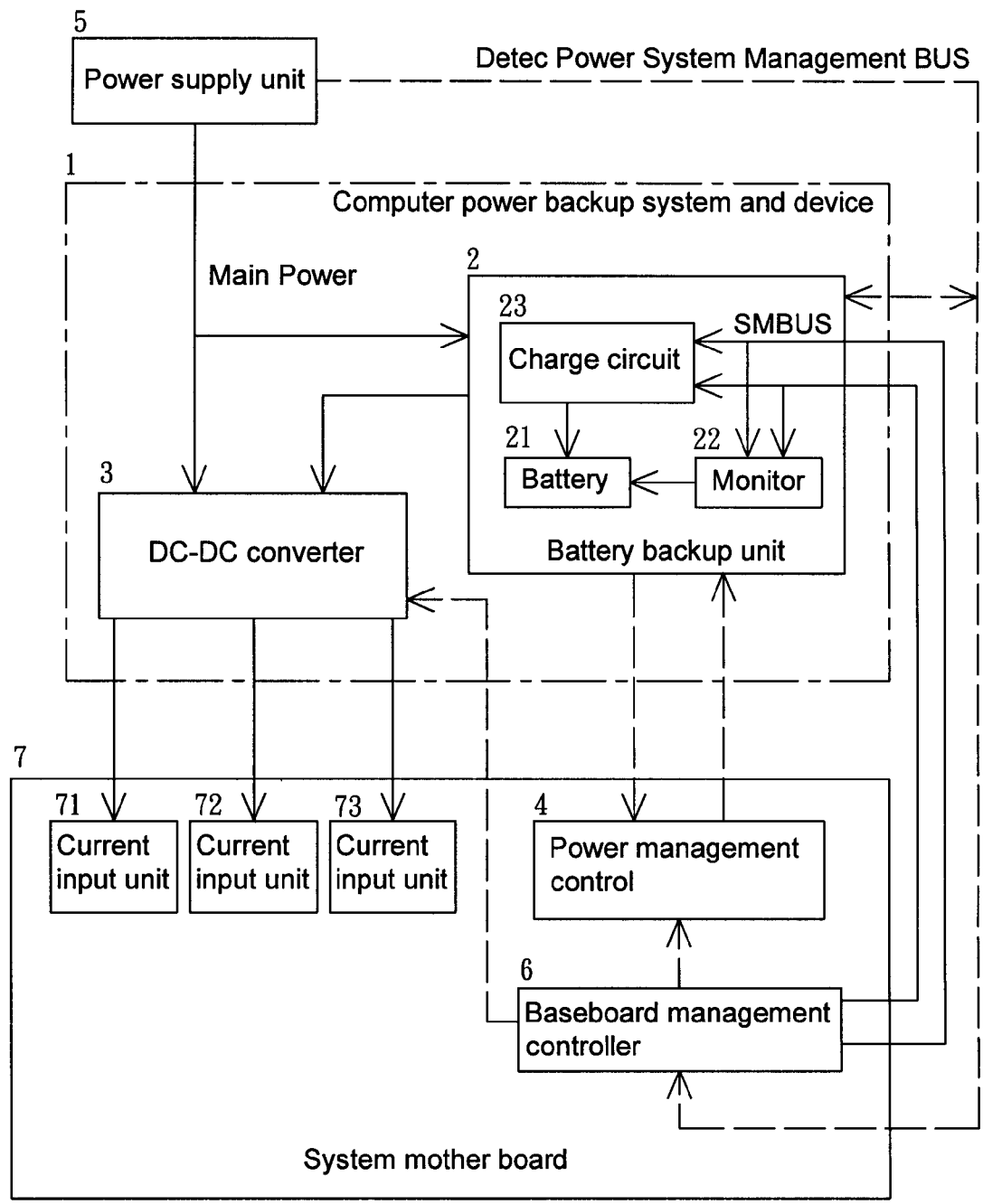
FIG. 1 is a structural diagram of a computer power backup system and device according to the present invention.

The present invention mainly provides a backup system for replacing the conventional UPS systems. When mains electricity or the power supply unit of a computer server fails, the backup system of the present invention automatically switches to a battery for backup power supply. The system provided by the present invention can be used alone as an uninterruptible power supply backup system or used in conjunction with a conventional UPS system so as to extend the service life of the computer server.

The system proposed by the present invention can be integrated into the system of a computer server. Through a built-in power management control, the statuses of the entire computer system, of a power supply unit, and of a battery are constantly monitored. When it is detected that the computer system is out of power, the power management control sends out an alert to an enterprise client and thereby requests the enterprise client to back up data. If the enterprise client fails to take timely action before backup power in the battery is used up, a safe-shutdown command will be sent out automatically to the operation system, through proper setting of management software.

When power to the computer system is restored, the power management control charges the battery automatically. Thus, the data of the enterprise client are well protected through a cycle of working and contingency states of the computer system.

Referring to FIG. 1 for a computer power backup system and device 1 according to the present invention, the device 1 essentially includes a battery backup unit (BBU) 2, a DC-DC converter 3, and a power management control 4 connected to a baseboard management controller (BMC) 6 built in a computer system motherboard 7.

The battery backup unit 2 of the present invention and a power supply unit (PSU) 5 are connected to the power management control 4 of the baseboard management controller 6 built in the system motherboard 7, via a detect power system management BUS (DPSMBUS).

The battery backup unit 2 includes a battery (+12V) 21, a monitor 22, and a charge circuit 23. The monitor 22 and the charge circuit 23 are connected to the battery 21 and the baseboard management controller 6 via a system management BUS (SMBUS).

The battery backup unit 2 serves mainly to provide power from the battery 21 to the DC-DC converter 3 via the power management control 4 when the computer system loses power, thereby preventing the computer system from immediate shutdown. When power to the compute system is restored, the monitor 22 automatically instructs the charge circuit 23 to charge the battery 21, thus allowing the computer power backup system to remain effective in data protection.

The DC-DC converter 3 of the present invention has an input end connected to the power supply unit 5, the battery backup unit 2, and the baseboard management controller 6. The DC-DC converter 3 of the present invention further has an output end connected to various current input units 71, 72, 73 of the system motherboard 7.

The DC-DC converter 3 serves mainly to convert power provided by the power supply unit 5 and the battery backup unit 2 into power suitable for use by the system motherboard 7.

The power management control 4 is built in with executive programs of the system motherboard 7. The power management control 4 is connected to the baseboard management controller 6 and the battery backup unit 2.

In the computer power backup system and device 1 of the present invention, the power management control 4 constantly monitors the statuses of the computer system, of the power supply unit 5, and of the battery 21 of the battery backup unit 2. When it is detected that the computer system loses power, the power management control 4 sends out an alert to an enterprise client, thereby requesting the enterprise client to back up data. If the enterprise client does not take timely action before backup power in the battery 21 of the battery backup unit 2 is used up, the power management control 4 will send out a command so as for the baseboard management controller 6 and the system motherboard 7 to store data automatically and safely in a storage device and for the computer system to be shut down safely. When power is restored, the power management control 4 turns on the power system automatically and begins to charge the battery 21 of the battery backup unit 2. Through the above operation, the integrity and safety of data in the computer system are secured.

Referring to FIG. 2, the computer power backup system and device 1 of the present invention is connected by itself to a computer system and used as an uninterruptible power supply backup system. Referring to FIG. 3, the computer power backup system and device 1 of the present invention is used in series connection with a conventional UPS system 8 so as to provide double protection against power outage, thereby extending the service life of a computer server.

What is claimed is:

1. A computer power backup system comprising: a battery backup unit connected to a power management control of a computer system via a baseboard management controller, the power management control constantly monitoring statuses of the computer system, of a power supply unit, and of a battery of the battery backup unit, when the power management control detects a power outage of the computer system, the power management control sends out an alert to an enterprise client requesting the enterprise client to back up data, and if the enterprise client fails to take timely action before backup power in the battery of the battery backup unit is used up, the power management control will send out a command whereby a system motherboard stores data automatically and safely in a storage device through the baseboard management controller and the computer system is shut down safely, the power management control automatically turning on the computer system and charging the battery of the battery backup unit when power to the computer system is restored;
wherein the battery is directly connected to a charge circuit and a monitor of the battery backup unit;
wherein the charge circuit is directly connected to the battery and the monitor of the battery backup unit;
wherein the monitor and the charge circuit are connected to the battery and the baseboard management controller via a system management BUS.

2. The computer power backup system of claim 1, wherein the computer power backup system is connected by itself to the computer system so as to serve as an uninterruptible power supply backup system, or is used in series connection with an uninterruptible power supply system so as to provide double protection against power outage.

3. A computer power backup device, comprising a battery backup unit, a DC-DC converter, and a power management control built in a system motherboard and connected to a baseboard management controller of a computer system, wherein:
the battery backup unit is connected to a power supply unit and the power management control, the battery backup unit comprising a battery, a monitor, and a charge circuit, wherein the monitor and the charge circuit are connected to the battery and the baseboard management controller;
the DC-DC converter has an input end connected to the power supply unit, the battery backup unit, and the baseboard management controller, and an output end connected to various current input units of the system motherboard; and
the power management control is built in with executive programs of the computer system and is connected to the baseboard management controller and the battery backup unit;

wherein the battery is directly connected to the charge circuit and the monitor of the battery backup unit;

wherein the charge circuit is directly connected to the battery and the monitor of the battery backup unit;

wherein the monitor and the charge circuit are connected to the battery and the baseboard management controller via a system management BUS.

4. The computer power backup device of claim 3, wherein the battery backup unit serves mainly to provide power from the battery through the power management control when power to the computer system is lost, thus preventing the computer system from being shut down immediately, and wherein the monitor automatically instructs the charge circuit to charge the battery when power to the computer system is restored, thus allowing the computer power backup device to remain effective in data protection.

5. The computer power backup device of claim 3, wherein the DC-DC converter serves mainly to convert power provided by the power supply unit and the battery backup unit into power suitable for use by the system motherboard.

* * * * *